US012362424B2

(12) United States Patent
Lee et al.

(10) Patent No.: US 12,362,424 B2
(45) Date of Patent: Jul. 15, 2025

(54) BATTERY TRANSPORTING APPARATUS

(71) Applicant: LG ENERGY SOLUTION, LTD., Seoul (KR)

(72) Inventors: Dong-Hee Lee, Daejeon (KR); Sung-Guk Hong, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 778 days.

(21) Appl. No.: 17/637,368

(22) PCT Filed: May 13, 2020

(86) PCT No.: PCT/KR2020/006288
§ 371 (c)(1),
(2) Date: Feb. 22, 2022

(87) PCT Pub. No.: WO2021/071042
PCT Pub. Date: Apr. 15, 2021

(65) Prior Publication Data
US 2022/0320670 A1    Oct. 6, 2022

(30) Foreign Application Priority Data
Oct. 11, 2019 (KR) .................. 10-2019-0126475

(51) Int. Cl.
*H01M 50/256* (2021.01)
*H01M 50/262* (2021.01)
*H01M 50/267* (2021.01)

(52) U.S. Cl.
CPC ....... *H01M 50/256* (2021.01); *H01M 50/262* (2021.01); *H01M 50/267* (2021.01)

(58) Field of Classification Search
CPC ............ H01M 50/256; H01M 50/262; H01M 50/267; B65D 25/10; B65D 2585/88; Y02E 60/10
See application file for complete search history.

(56) References Cited

FOREIGN PATENT DOCUMENTS

| CN | 105668043 A | 6/2016 |
|---|---|---|
| CN | 208256831 U | 12/2018 |

(Continued)

OTHER PUBLICATIONS

Lee WO2020162661 A1, EPO machine translation, 2020 (Year: 2020).*

(Continued)

*Primary Examiner* — Jonathan G Leong
*Assistant Examiner* — Kan Luo
(74) *Attorney, Agent, or Firm* — Birch, Stewart, Kolasch & Birch, LLP

(57) ABSTRACT

Disclosed is a battery transporting apparatus including a frame member for supporting a battery cell; a pair of electrode lead support members movably mounted to the frame member to be adjustable in a length direction of the battery cell among length, width and thickness directions of the battery cell and for supporting electrode leads of the battery cell, respectively; a lengthwise rotary shaft coupled to the frame member; and a lengthwise moving member coupled to the pair of electrode lead support members and coupled to the lengthwise rotary shaft, the lengthwise moving member moves along the lengthwise rotary shaft when the lengthwise rotary shaft rotates so that the pair of electrode lead support members are moved.

7 Claims, 8 Drawing Sheets

(56) References Cited

FOREIGN PATENT DOCUMENTS

| | | |
|---|---|---|
| CN | 109449496 A | 3/2019 |
| CN | 110040637 A | 7/2019 |
| CN | 102233993 A | 5/2025 |
| EP | 4 016 661 A1 | 6/2022 |
| KR | 20-0133692 Y1 | 3/1999 |
| KR | 1999-0024942 U | 7/1999 |
| KR | 10-2010-0044418 A | 4/2010 |
| KR | 10-2013-0079738 A | 7/2013 |
| KR | 10-2015-0144608 A | 12/2015 |
| KR | 10-2017-0089481 A | 8/2017 |
| KR | 10-2017-0114852 A | 10/2017 |
| KR | 10-2019-0008698 A | 1/2019 |
| KR | 10-1949687 B1 | 2/2019 |
| WO | WO 2020/162661 A1 | 8/2020 |

OTHER PUBLICATIONS

Lee KR20170114852 A, EPO machine translation, 2017 (Year: 2017).*
International Search Report for PCT/KR2020/006288 (PCT/ISA/210) mailed on Aug. 21, 2020.
Extended European Search Report for European Application No. 20875403.6, dated Sep. 9, 2022.

* cited by examiner

* # BATTERY TRANSPORTING APPARATUS

TECHNICAL FIELD

The present application claims priority to Korean Patent Application No. 10-2019-0126475 filed on Oct. 11, 2019 in the Republic of Korea, the disclosures of which are incorporated herein by reference.

The present disclosure relates to a battery transporting apparatus, and more particularly, to a battery transporting apparatus capable of adjusting an interval in a length direction among length, width and thickness directions of a battery cell.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery (hereinafter, just referred to as a "battery") includes an electrode assembly in which a positive electrode plate and a negative electrode plate, respectively coated with the positive electrode active material and the negative electrode active material, are arranged with a separator therebetween, and an exterior, that is a battery case, which seals and receives the electrode assembly together with an electrolyte solution.

Meanwhile, in a battery production line, a battery transporting device capable of receiving a large amount of thin batteries upright is used as a means for safely storing and transporting batteries when moving from a process to a process or when shipping finished products.

A conventional battery transporting device has a problem in that it is inconvenient to adjust an interval between main cassettes since a worker directly moves the main cassettes after releasing a bolt and nut and also the worker fixes the bolt and nut again after moving the main cassettes.

DISCLOSURE

Technical Problem

Therefore, the present disclosure is directed to providing a battery transporting apparatus, which may transport battery cells having various sizes in a length direction among length, width and thickness directions of the battery cell by using one transporting device.

Technical Solution

In one aspect of the present disclosure, there is provided a battery transporting apparatus, comprising: a frame member configured to support a battery cell; a pair of electrode lead support members movably mounted to the frame member to be adjustable in a length direction of the battery cell among length, width and thickness directions of the battery cell and configured to support electrode leads of the battery cell, respectively; a lengthwise rotary shaft coupled to the frame member; and a lengthwise moving member coupled to the pair of electrode lead support members and coupled to the lengthwise rotary shaft, the lengthwise moving member being configured to move along the lengthwise rotary shaft when the lengthwise rotary shaft rotates so that the pair of electrode lead support members are moved.

Also, the frame member may include a first frame disposed in the length direction of the battery cell; a second frame spaced apart from the first frame to form a space between the first frame and the second frame and disposed in the length direction of the battery cell; a third frame configured to connect a first end of the first frame to a first end of the second frame; and a fourth frame configured to connect a second end of the first frame to a second end of the second frame at a location opposite to the third frame, and the lengthwise rotary shaft may be disposed in the length direction of the battery cell inside the space between the first frame and the second frame.

In addition, the battery transporting apparatus may further comprise a lengthwise rotating member coupled to the lengthwise rotary shaft to rotate the lengthwise rotary shaft, a first side of the lengthwise rotary shaft may be coupled to the fourth frame and a second side of the lengthwise rotary shaft may be fixed to the lengthwise rotating member, and the lengthwise rotary shaft may rotate in association with the rotation of the lengthwise rotating member.

Also, the lengthwise moving member may be provided in a pair so that the pair of lengthwise moving members are respectively coupled to the pair of electrode lead support members, and the pair of lengthwise moving members may move along the lengthwise rotary shaft so that the pair of electrode lead support members move closer to each other or move away from each other.

In addition, the lengthwise rotary shaft may include a lengthwise first thread portion coupled to a first lengthwise moving member among the pair of lengthwise moving members; a lengthwise second thread portion coupled to a second lengthwise moving member among the pair of lengthwise moving members; and a lengthwise non-thread portion provided between the lengthwise first thread portion and the lengthwise second thread portion and having no thread, and the lengthwise first thread portion and the lengthwise second thread portion may have threads formed in opposite directions.

Also, the lengthwise rotating member may include a lengthwise connector guide coupled and fixed to the third frame; a lengthwise elastic member configured to contact the lengthwise rotary shaft; and a lengthwise connector inserted into the lengthwise connector guide to press the lengthwise elastic member so that the lengthwise elastic member is elastically contracted.

In addition, the lengthwise connector may have a perforated hole formed therein, a pressing bar may be provided vertically at an inner side of the lengthwise connector, and the lengthwise elastic member may be inserted into the perforated hole and pressed by the pressing bar.

Also, the lengthwise connector guide may include a lengthwise first guide having an inner surface of a regular hexagonal shape; and a lengthwise second guide having an inner surface of a circular shape, and the lengthwise connector may include a lengthwise first outer surface portion having an outer surface of a regular hexagonal shape to correspond to the lengthwise first guide; and a lengthwise second outer surface portion having an outer surface of a circular shape to correspond to the lengthwise second guide.

In addition, a rail-shaped rail groove may be formed at the first frame and the second frame, a first movement guide is inserted into the rail groove to move along the rail groove may be further provided, and the electrode lead support member may be coupled to the first movement guide to move together with the first movement guide.

Also, the pair of electrode lead support members may have an insert groove so that the first movement guide is inserted into the insert groove.

In addition, the battery transporting apparatus may further comprise a second movement guide spaced apart from the first movement guide and coupled to an end of the pair of electrode lead support members, and the second movement guide may contact side surfaces of ends of the first frame and the second frame to move along the side surfaces of the ends of the first frame and the second frame.

Advantageous Effects

According to embodiments of the present disclosure, since the pair of electrode lead support members respectively supporting the electrode leads of the battery cell are adjustable in the length direction of the battery cell, it is possible to transport battery cells having various sizes in the length direction of the battery cell.

In addition, since the electrode lead support member is moved by the operation of the lengthwise moving member, it is easy to adjust the interval between the pair of electrode lead support members.

BEST MODE

Figure 1:
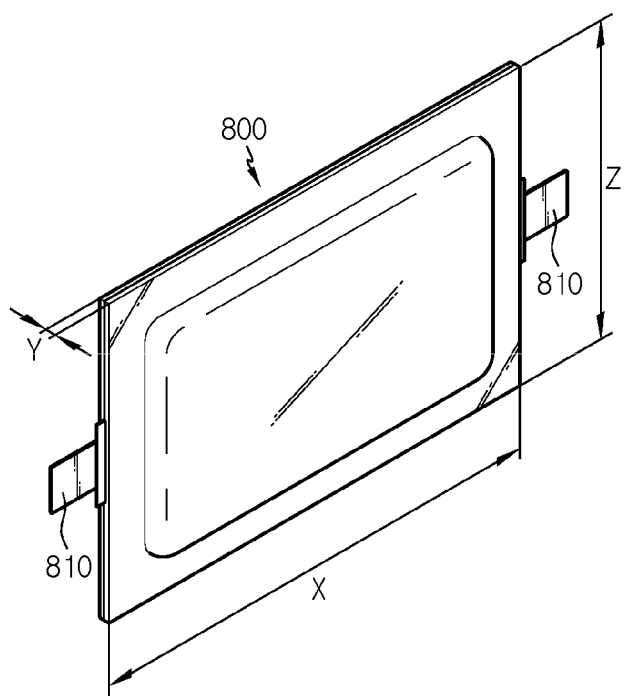
FIG. 1 is a schematic perspective view showing a battery cell that is transported by a battery transporting apparatus according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'coupling' or 'connecting' as used herein, may refer not only to a case where one member and another member are directly combined or directly connected but also a case where one member is indirectly combined with another member via a connecting member or is indirectly connected.

Figure 2:
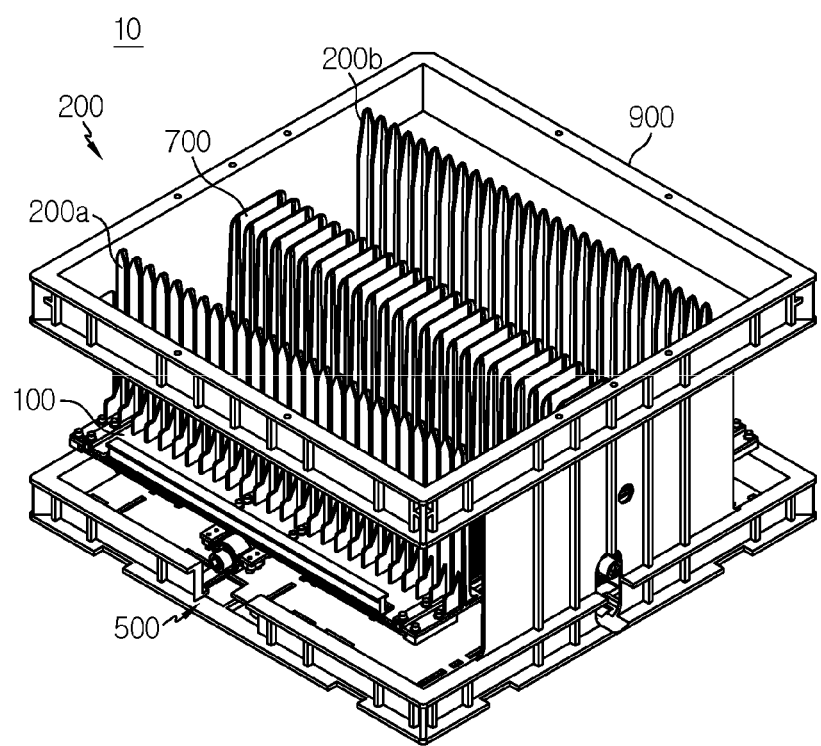
FIG. 2 is a perspective view showing the battery transporting apparatus according to an embodiment of the present disclosure entirely.
Figure 3:
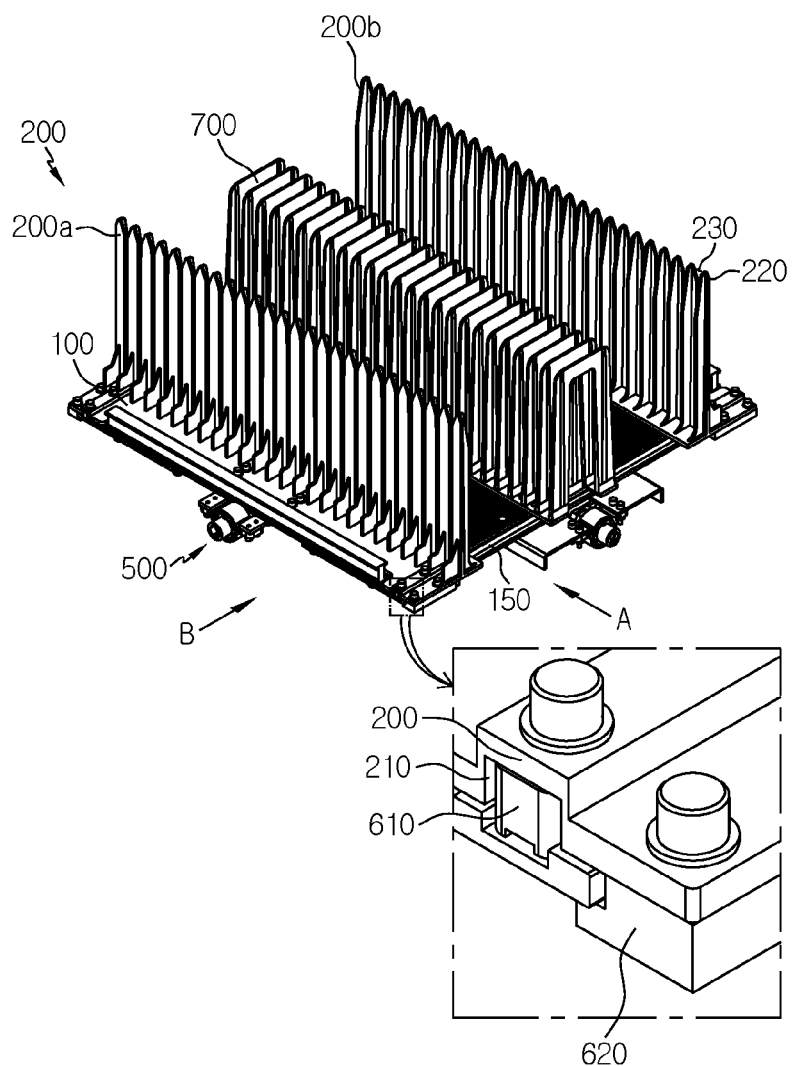
FIG. 3 is a perspective view showing a pair of electrode lead support members and a cell support member of FIG. 2 from which a protecting member is removed.
Figure 4:
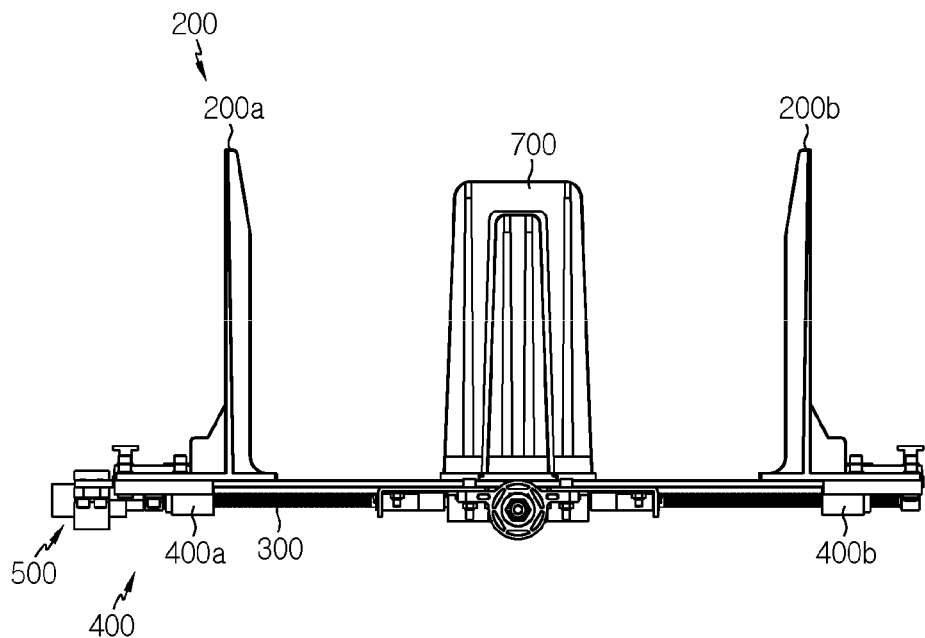
FIG. 4 is a diagram observed along an arrow A of FIG. 3 in which the pair of electrode lead support members are moved away from each other.
Figure 5:
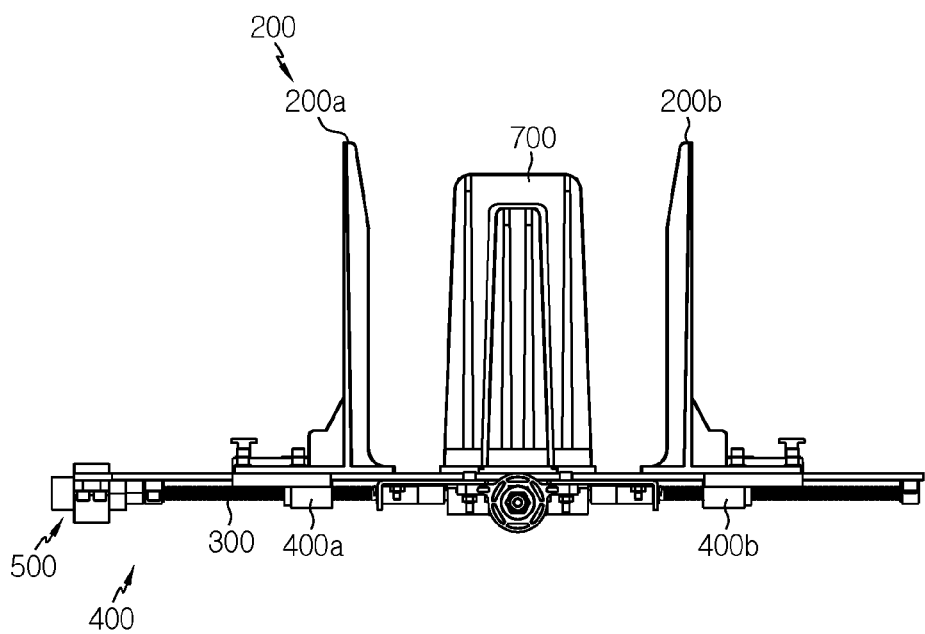
FIG. 5 is a diagram observed along the arrow A of FIG. 3 in which the pair of electrode lead support members are moved closer to each other.
Figure 6:
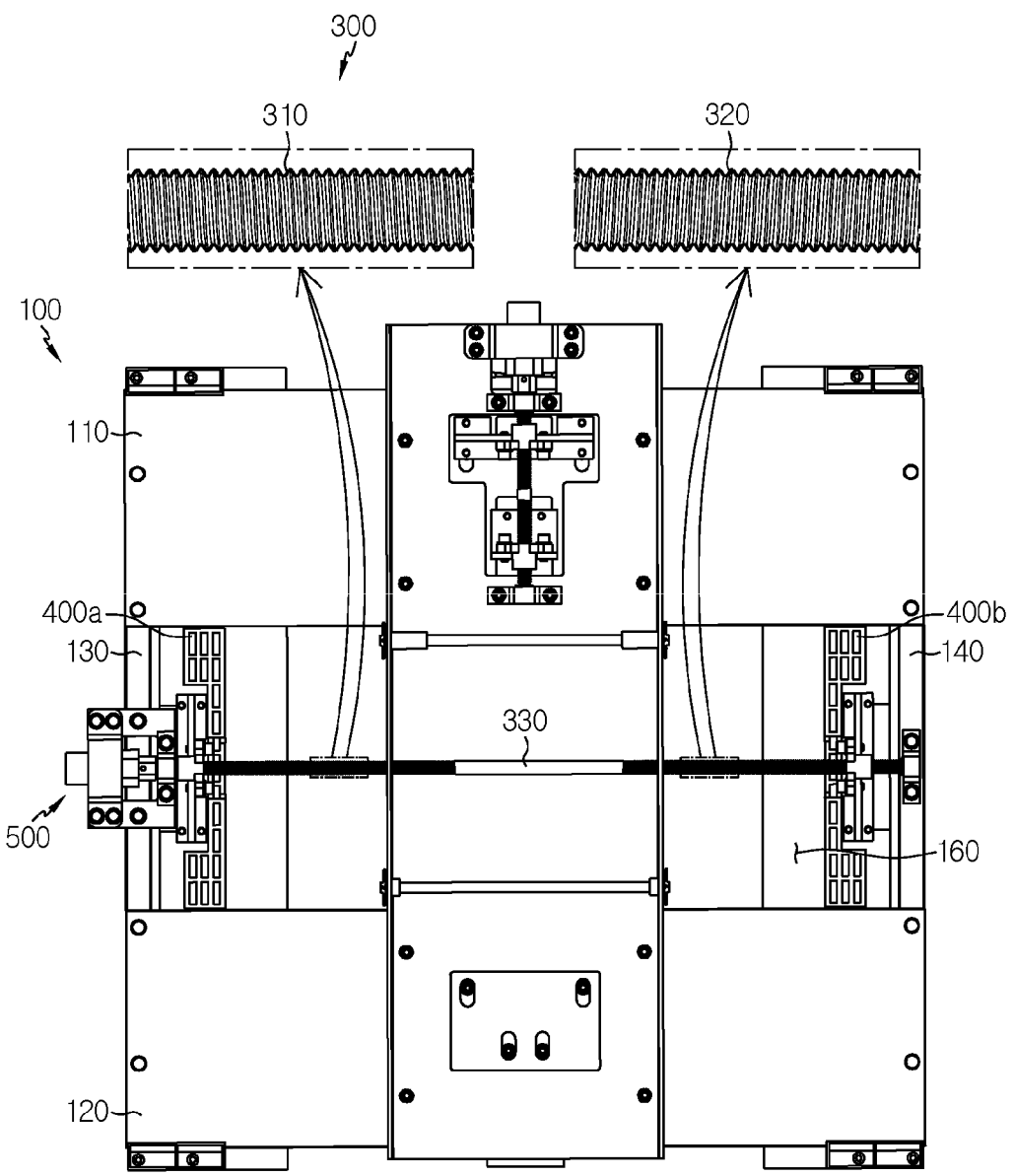
FIG. 6 is a bottom view of FIG. 3 and a partially enlarged view showing a lengthwise rotary shaft.
Figure 7:
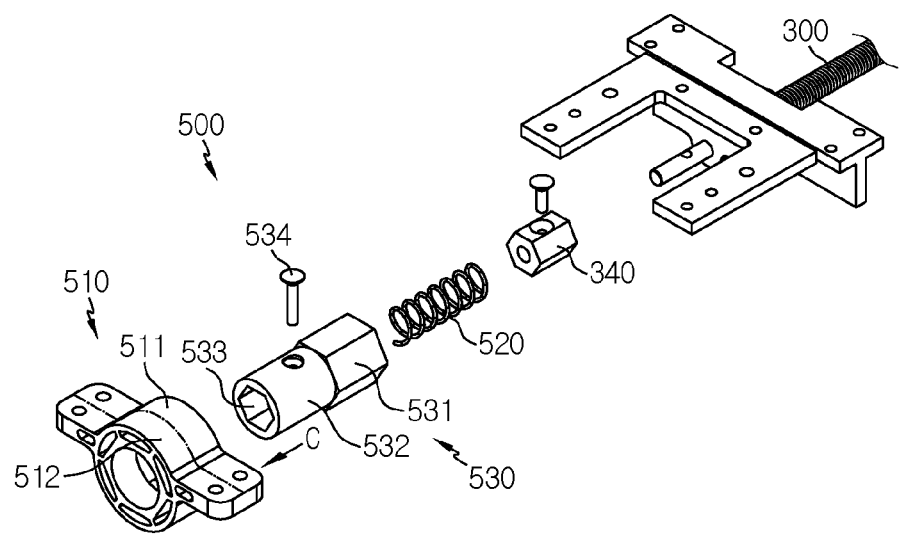
FIG. 7 is an exploded perspective view showing a lengthwise rotating member of the battery transporting apparatus according to an embodiment of the present disclosure.
Figure 8:
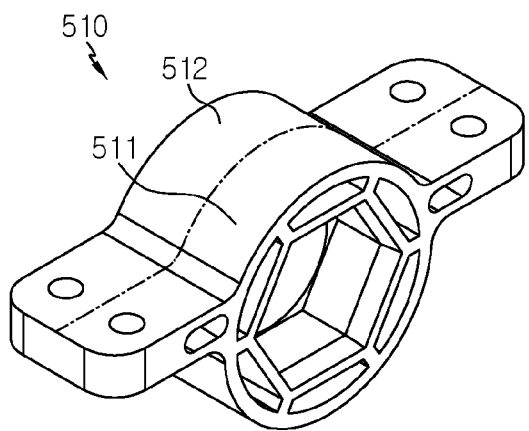
FIG. 8 is a diagram showing a lengthwise connector guide along an arrow C of FIG. 7.
Figure 9:
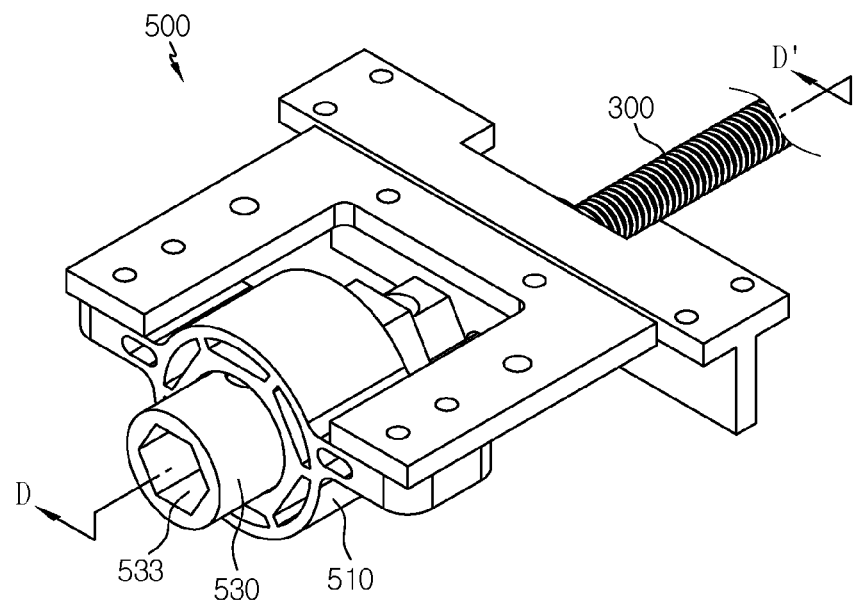
FIG. 9 is an assembled perspective view showing the lengthwise rotating member of FIG. 7.
Figure 10:
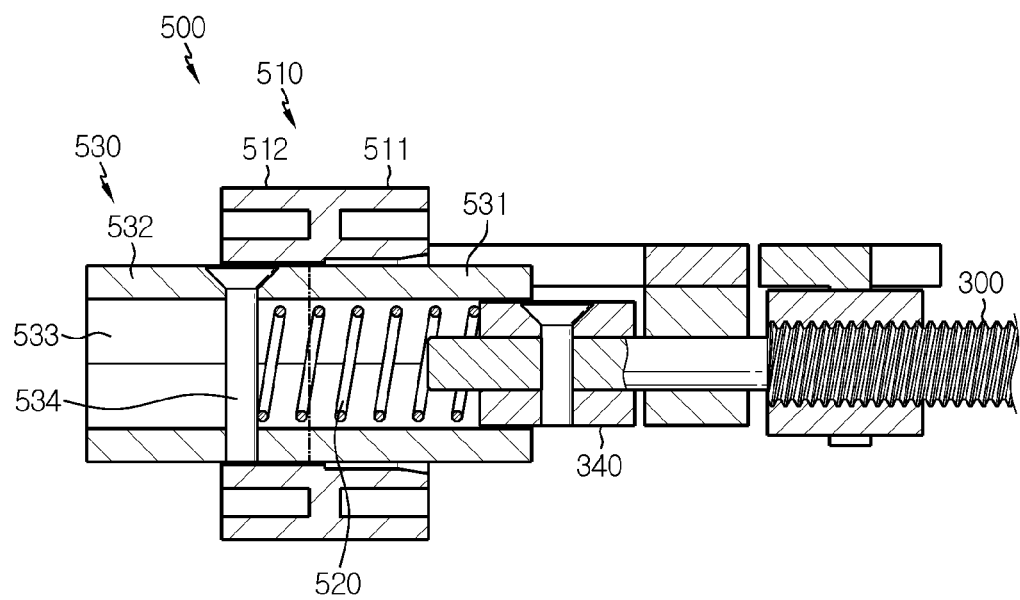
FIG. 10 is a cross-sectioned view, taken along the line D-D' of FIG. 9.
Figure 11:
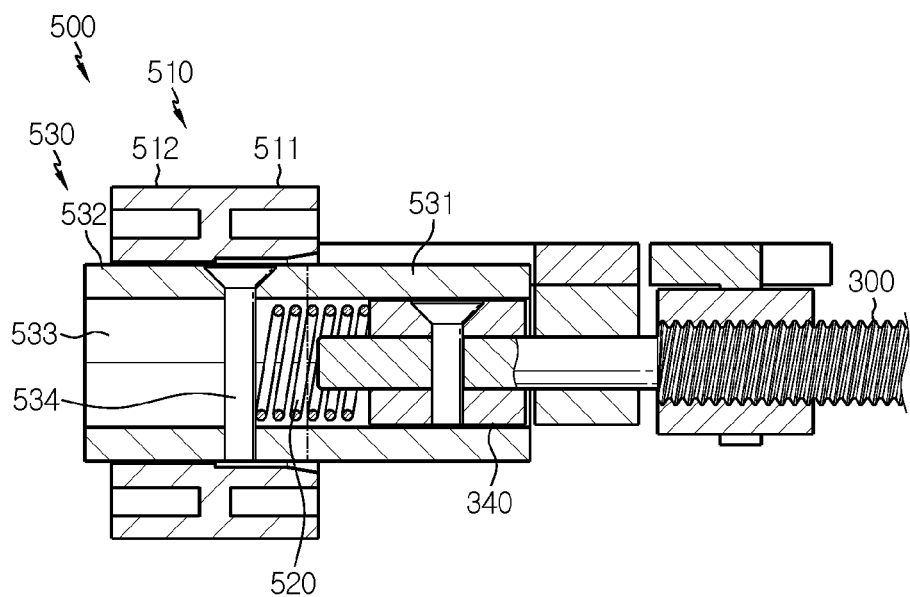
FIG. 11 is a cross-sectioned view showing that the lengthwise connector is moved into the lengthwise connector guide to operate the lengthwise rotating member in FIG. 10.
Figure 12:
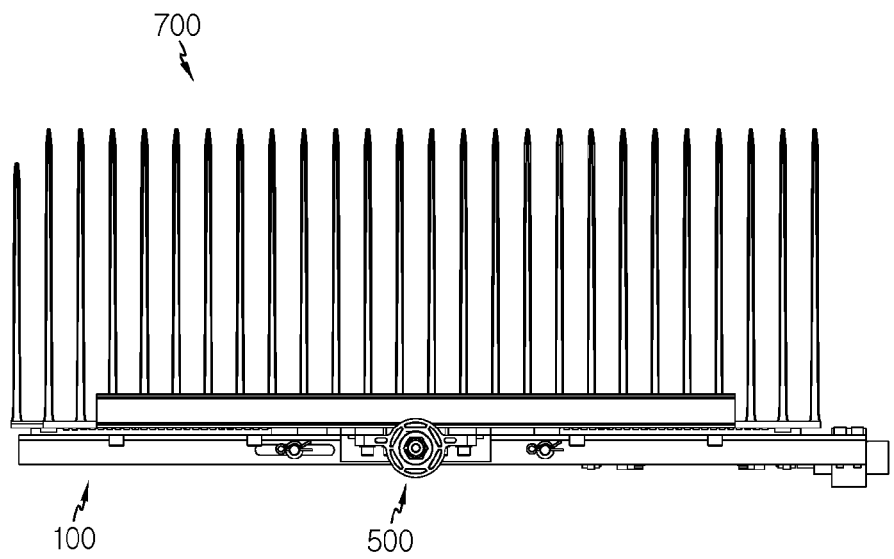
FIG. 12 is a diagram observed along an arrow B of FIG. 3 in which the pair of electrode lead support members are removed in FIG. 3.

FIG. 1 is a schematic perspective view showing a battery cell that is transported by a battery transporting apparatus according to an embodiment of the present disclosure, FIG. 2 is a perspective view showing the battery transporting apparatus according to an embodiment of the present disclosure entirely, FIG. 3 is a perspective view showing a pair of electrode lead support members and a cell support member of FIG. 2 from which a protecting member is removed, FIG. 4 is a diagram observed along an arrow A of FIG. 3 in which the pair of electrode lead support members are moved away from each other, FIG. 5 is a diagram observed along the arrow A of FIG. 3 in which the pair of electrode lead support members are moved closer to each other, FIG. 6 is a bottom view of FIG. 3 and a partially enlarged view showing a lengthwise rotary shaft, FIG. 7 is an exploded perspective view showing a lengthwise rotating member of the battery transporting apparatus according to an embodiment of the present disclosure, FIG. 8 is a diagram showing a lengthwise connector guide along an arrow C of FIG. 7, FIG. 9 is an assembled perspective view showing the lengthwise rotating member of FIG. 7, FIG. 10 is a cross-sectioned view, taken along the line D-D' of FIG. 9, FIG. 11 is a cross-sectioned view showing that the lengthwise connector is moved into the lengthwise connector guide to operate the lengthwise rotating member in FIG. 10, and FIG. 12 is a diagram observed along an arrow B of FIG. 3 in which the pair of electrode lead support members are removed in FIG. 3.

In this specification, a battery transporting apparatus 10 may have various forms, and may be formed as, for example, a battery transporting tray having a protecting member 900 (see FIG. 2). However, the present disclosure is not limited thereto.

Meanwhile, in this specification, length, width and thickness of the battery cell 800 will be described based on FIG. 1. That is, an X direction of FIG. 1 is a length direction of the battery cell 800, a Y direction of FIG. 1 is a thickness direction of the battery cell 800, and a Z direction of FIG. 1 is a width direction of the battery cell 800.

Referring to the drawings, the battery transporting apparatus 10 according to an embodiment of the present disclosure includes a frame member 100, an electrode lead support member 200, a lengthwise rotary shaft 300, and a lengthwise moving member 400.

The battery transporting apparatus 10 according to an embodiment of the present disclosure is adjustable in a length direction of the battery cell 800 among length, width and thickness directions of the battery cell 800.

The frame member 100 is provided to support the battery cell 800. The battery cell 800 may have various structures, and an electrode lead 810 is provided thereto. The electrode lead 810 provided to the battery cell 800 is a type of terminal exposed to the outside and connected to an external device, and may be made of a conductive material.

The electrode lead 810 includes a positive electrode lead and a negative electrode lead. The positive electrode lead and the negative electrode lead may be disposed in opposite directions with respect to the length direction of the battery cell 800, or the positive electrode lead and negative electrode lead may be disposed in the same direction with respect to the length direction of the battery cell 800.

The electrode lead 810 may be electrically coupled to a bus bar. The battery cell 800 may have a structure in which a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity.

The battery cell 800 may be provided in various forms, but for convenience of explanation, it will be described that the battery cell 800 is a pouch-type battery cell as shown in FIG. 1.

The frame member 100 may support the battery cell 800 in various ways. For example, an electrode lead support member 200 may be mounted to the frame member 100, and the electrode lead support member 200 mounted to the frame member 100 may be configured to support the electrode lead 810 of the battery cell 800. In addition, referring to FIGS. 3 and 12, a cell support member 700 may be mounted to the frame member 100 to support a center portion of the battery cell 800. Here, the cell support member 700 may be configured to be fixed or adjustable.

Referring to FIG. 6, the frame member 100 may include a first frame 110, a second frame 120, a third frame 130 and a fourth frame 140. The frame member 100 may be formed in various shapes and, for example, may be formed in a square shape. However, the shape of the frame member 100 is not limited thereto.

The first frame 110 and the second frame 120 may be arranged in a length direction of the battery cell 800. Here, the second frame 120 is spaced apart from the first frame 110, and thus, a space 160 of a preset range (see FIG. 6) is formed between the first frame 110 and the second frame 120. In addition, a lengthwise rotary shaft 300, explained later, is arranged in the length direction of the battery cell 800 inside the space 160 between the first frame 110 and the second frame 120.

The third frame 130 connects one ends of the first frame 110 and the second frame 120, and the fourth frame 140 connects the other ends of the first frame 110 and the second frame 120 at a location opposite to the third frame 130.

The electrode lead support member 200 is provided in a pair, and the pair of electrode lead support members 200 support electrode leads 810 of the battery cell 800, respectively. Referring to FIG. 3, the electrode lead support member 200 may have a plurality of guide slots 200, and the electrode lead 810 of the battery cell 800 may be placed in a guide groove 230 formed at the guide slot 220.

The electrode lead support member 200 is movably mounted to the frame member 100. Referring to FIGS. 4 and 5, the lengthwise moving member 400 moves in a state of being coupled to the electrode lead support member 200, and the electrode lead support member 200 moves together with the lengthwise moving member 400. This will be described later in detail.

The pair of electrode lead support members 200a, 200b are adjustable in the length direction of the battery cell 800 among length, width and thickness directions of the battery cell 800. If the pair of electrode lead support members 200a, 200b are adjustable as above, battery cells 800 of various sizes, especially battery cells 800 of various sizes in the length direction, will be accommodated and supported by the pair of electrode lead support members 200a, 200b.

The lengthwise rotary shaft 300 is provided to rotate in a state of being coupled to the frame member 100.

Referring to FIG. 6, a lengthwise first thread portion 310, a lengthwise second thread portion 320 and a lengthwise non-thread portion 330 may be formed at the lengthwise rotary shaft 300.

In addition, the lengthwise first thread portion 310 and the lengthwise second thread portion 320 have threads formed with in opposite directions, and the lengthwise non-thread portion 330 having no thread is provided between the lengthwise first thread portion 310 and the lengthwise second thread portion 320.

In addition, one of the pair of lengthwise moving members 400a, 400b is coupled to the lengthwise first thread portion 310, and the other one of the pair of lengthwise moving members 400a, 400b is coupled to the lengthwise second thread portion 320.

Here, if the lengthwise rotary shaft 300 rotates in one direction, as shown in FIG. 5, the pair of lengthwise moving members 400a, 400b move closer to each other, and if the lengthwise rotary shaft 300 rotates in another direction, as in FIG. 4, the pair of lengthwise moving members 400a, 400b move away from each other.

The lengthwise moving member 400 is coupled to the lengthwise rotary shaft 300 to move along the lengthwise rotary shaft 300 when the lengthwise rotary shaft 300 rotates so that the pair of electrode lead support members 200a, 200b are moved. The lengthwise moving member 400 may be provided in a pair, and the pair of lengthwise moving members 400a, 400b are coupled to the pair of electrode lead support members 200a, 200b, respectively.

As described above, as the lengthwise rotary shaft 300 rotates, the pair of lengthwise moving members 400a, 400b coupled to the lengthwise rotary shaft 300 move closer to each other or away from each other.

Here, since the pair of electrode lead support members 200a, 200b are respectively coupled to the pair of lengthwise moving members 400a, 400b, the pair of electrode lead support members 200a, 200b also move as the pair of lengthwise moving members 400a, 400b move.

In other words, if the pair of lengthwise moving members 400a, 400b move closer to each other along the lengthwise rotary shaft 300, the pair of electrode lead support members 200a, 200b also move closer to each other, and if the pair of lengthwise moving members 400a, 400b moves away from each other along the lengthwise rotary shaft 300, the pair of electrode lead support members 200a, 200b also move away from each other.

The lengthwise rotating member 500 is coupled to the lengthwise rotary shaft 300 and is configured to rotate the lengthwise rotary shaft 300. The lengthwise rotary shaft 300 may be rotated in various ways. A worker may manually rotate the lengthwise rotary shaft 300, or a tool may be used to rotate the lengthwise rotary shaft 300. Alternatively, the lengthwise rotating member 500 may be coupled to the lengthwise rotary shaft 300, and the lengthwise rotary shaft 300 may be rotated by means of the lengthwise rotating member 500.

Referring to FIG. 6, one side of the lengthwise rotary shaft 300 is coupled to the fourth frame 140, and the other side of the lengthwise rotary shaft 300 is coupled to the lengthwise rotating member 500. In addition, if the lengthwise rotating member 500 rotates, the lengthwise rotary shaft 300 also rotates in association with the rotation of the lengthwise rotating member 500.

Referring to FIG. 7, the lengthwise rotating member 500 may include a lengthwise connector guide 510, a lengthwise elastic member 520, and a lengthwise connector 530.

The lengthwise connector guide 510 is coupled and fixed to the third frame 130 (see FIG. 6).

The lengthwise connector guide 510 may include a lengthwise first guide 511 and a lengthwise second guide 512. The lengthwise first guide 511 may have an inner surface of a polygonal shape. For example, referring to FIG. 8, the lengthwise first guide 511 may have an inner surface of a regular hexagonal shape. Hereinafter, for convenience of description, it will be described that the inner surface of the lengthwise first guide 511 has a regular hexagonal shape, but the present disclosure is not limited thereto.

In addition, referring to FIG. 7, the lengthwise second guide 512 may have an inner surface of a circular shape. Here, the lengthwise first guide 511 and the lengthwise second guide 512 may have an integrated form or may be detachably formed.

The lengthwise elastic member 520 is inserted into the lengthwise connector 530 to contact the lengthwise rotary shaft 300. The lengthwise elastic member 520 transmits an elastic recovery force to the lengthwise connector 530. This will be described later in detail.

The lengthwise connector 530 is inserted into the lengthwise connector guide 510 and presses the lengthwise elastic member 520 so that the lengthwise elastic member 520 is elastically contracted. For example, a perforated hole 533 is formed in the lengthwise connector 530, and the lengthwise elastic member 520 is inserted into the perforated hole 533. In addition, a pressing bar 534 is provided vertically to an inner side of the lengthwise connector 530. As shown in FIG. 11, when the lengthwise connector 530 is inserted into the lengthwise connector guide 510, the pressing bar 534 presses the lengthwise elastic member 520.

A lengthwise first outer surface portion 531 and a lengthwise second outer surface portion 532 may be formed at the lengthwise connector 530. The lengthwise first outer surface portion 531 has an outer surface of a regular hexagonal shape to correspond to the lengthwise first guide 511. Here, the outer surface of the lengthwise first outer surface portion 531 is not limited to the regular hexagonal shape, and may have various shapes to correspond to the shape of the inner surface of the lengthwise first guide 511. In addition, the lengthwise second outer surface portion 532 has an outer surface of a circular shape to correspond to the lengthwise second guide 512.

When a tool such as a hexagonal wrench is coupled to the lengthwise connector 530 to give a pressure, the pressing bar 534 provided to the lengthwise connector 530 elastically contracts the lengthwise elastic member 520 as shown in FIG. 11, and the lengthwise second outer surface portion 532 having an outer surface of a circular shape moves to the lengthwise first guide 511. Here, since the lengthwise first outer surface portion 531 having an outer surface of a regular hexagonal shape moves from the lengthwise first guide 511, the lengthwise connector 530 may be rotated.

At this time, a hexagonal coupling portion 340 having a regular hexagonal shape is formed at an end of the lengthwise rotary shaft 300, and a regular hexagon is also formed at the lengthwise connector 530 to which the hexagonal coupling portion 340 of the lengthwise rotary shaft 300 is coupled. That is, at least a portion of the perforated hole 533 of the lengthwise connector 530, for example a portion coupled to the hexagonal coupling portion 340 of the lengthwise rotary shaft 300, is formed to have a regular hexagonal shape.

Therefore, if a tool such as a hexagonal wrench is coupled to the lengthwise connector 530 to give a pressure, the perforated hole 533 of the lengthwise connector 530 formed in a regular hexagonal shape moves so as to be coupled to the hexagonal coupling portion 340 of the lengthwise rotary shaft 300 more deeply (see FIGS. 10 and 11).

In addition, if the lengthwise connector 530 is rotated using a tool such as a hexagonal wrench, the lengthwise rotary shaft 300 coupled to the lengthwise connector 530 also rotates together with the lengthwise connector 530.

In addition, if the lengthwise rotary shaft 300 stops rotating, the hexagonal wrench is removed from the lengthwise connector 530. If the hexagonal wrench is removed from the lengthwise connector 530, in a state where the lengthwise elastic member 520 is in contact with the pressing bar 534 of the lengthwise connector 530, the elastic recovery force of the lengthwise elastic member 520 is provided to the pressing bar 534, as shown in FIG. 10. Thus, the lengthwise first outer surface portion 531 of the lengthwise connector guide 530 moves to the lengthwise first guide 511 of the lengthwise connector guide 510 and is inserted therein.

Here, since the outer surface of the lengthwise first outer surface portion 531 has a regular hexagonal shape and the inner surface of the lengthwise first guide 511 also has a regular hexagonal shape, if the lengthwise first outer surface portion 531 is inserted into the lengthwise first guide 511, the lengthwise first outer surface portion 531 is prevented from rotating. That is, if the hexagonal wrench is removed from the lengthwise connector 530, the lengthwise connector 530 is caught by the lengthwise connector guide 510 to prevent rotation, and the lengthwise rotary shaft 300 coupled to the lengthwise connector 530 is also prevented from rotating.

That is, if the lengthwise connector 530 is rotated using a tool such as a hexagonal wrench, the lengthwise rotary shaft 300 also rotates together with the lengthwise connector 530, so the interval between the electrode lead support members 200 is adjusted. However, if the tool such as a hexagonal wrench is removed from the lengthwise connector 530, the lengthwise first outer surface portion 531 of the lengthwise connector 530 is coupled to the lengthwise first guide 511 of the lengthwise connector guide 510 to prevent the lengthwise rotary shaft 300 from rotating.

Referring to FIG. 3, a rail-shaped rail groove 150 may be formed at the first frame 110 and the second frame 120, and a first movement guide 610 may be provided to be inserted into the rail-shaped rail groove 150 formed at the first frame 110 and the second frame 120 and move along the rail groove 150.

Here, the electrode lead support member 200 may be coupled to the first movement guide 610 to move together with the first movement guide 610. To this end, an insert groove 210 into which the first movement guide 610 may be inserted may be formed at the electrode lead support member 200.

In addition, the second movement guide 620 may be spaced apart from the first movement guide 610 and coupled to an end of the electrode lead support member 200. For example, the second movement guide 620 may be provided to contact side surfaces of ends of the first frame 110 and the second frame 120 and move along the side surfaces of the ends of the first frame 110 and the second frame 120.

That is, the first movement guide 610 and the second movement guide 620 guide the movement of the electrode lead support member 200 such that the electrode lead support member 200 moves smoothly.

According to the above configuration, the pair of electrode lead support members 200a, 200b respectively supporting the electrode leads 810 of the battery cell 800 are adjustable in the length direction of the battery cell 800. Thus, various battery cells 800 having various sizes in the length direction may be transported using one transporting device.

In addition, since the electrode lead support member 200 is moved by the operation of the lengthwise moving member 400, it is easy to adjust the interval between the pair of electrode lead support members 200a, 200b.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery transporting apparatus, and may be used in industries related to batteries.

What is claimed is:

1. A battery transporting apparatus, comprising:
a frame member configured to support a battery cell;
a pair of electrode lead support members movably mounted to the frame member to be adjustable in a length direction of the battery cell among length, width and thickness directions of the battery cell and configured to support electrode leads of the battery cell, respectively;
a lengthwise rotary shaft coupled to the frame member; and
a lengthwise moving member coupled to the pair of electrode lead support members and coupled to the lengthwise rotary shaft, the lengthwise moving member being configured to move along the lengthwise rotary shaft so that when the lengthwise rotary shaft rotates the pair of electrode lead support members are moved,
wherein the frame member includes:
a first frame disposed in the length direction of the battery cell;
a second frame spaced apart from the first frame to form a space between the first frame and the second frame and disposed in the length direction of the battery cell;
a third frame configured to connect a first end of the first frame to a first end of the second frame; and
a fourth frame configured to connect a second end of the first frame to a second end of the second frame at a location opposite to the third frame,
wherein the lengthwise rotary shaft is disposed in the length direction of the battery cell inside the space between the first frame and the second frame,
wherein a rail-shaped rail groove is formed at the first frame and the second frame,
wherein a first movement guide is inserted into the rail groove to move along the rail groove,
wherein the electrode lead support member is coupled to the first movement guide to move together with the first movement guide,
wherein the pair of electrode lead support members have an insert groove so that the first movement guide is inserted into the insert groove,
wherein a second movement guide is spaced apart from the first movement guide and coupled to an end of the pair of electrode lead support members, and
wherein the second movement guide contacts side surfaces of ends of the first frame and the second frame to move along the side surfaces of the ends of the first frame and the second frame.

2. The battery transporting apparatus according to claim 1, further comprising:
a lengthwise rotating member coupled to the lengthwise rotary shaft to rotate the lengthwise rotary shaft,
wherein a first side of the lengthwise rotary shaft is coupled to the fourth frame and a second side of the lengthwise rotary shaft is fixed to the lengthwise rotating member, and
wherein the lengthwise rotary shaft rotates in association with the rotation of the lengthwise rotating member.

3. The battery transporting apparatus according to claim 2,
wherein the lengthwise moving member is provided in a pair so that the pair of lengthwise moving members are respectively coupled to the pair of electrode lead support members, and
wherein the pair of lengthwise moving members move along the lengthwise rotary shaft so that the pair of electrode lead support members move closer to each other or move away from each other.

4. The battery transporting apparatus according to claim 3,
wherein the lengthwise rotary shaft includes:
a lengthwise first thread portion coupled to a first lengthwise moving member among the pair of lengthwise moving members;
a lengthwise second thread portion coupled to a second lengthwise moving member among the pair of lengthwise moving members; and
a lengthwise non-thread portion provided between the lengthwise first thread portion and the lengthwise second thread portion and having no thread,
wherein the lengthwise first thread portion and the lengthwise second thread portion have threads formed in opposite directions.

5. The battery transporting apparatus according to claim 2,
wherein the lengthwise rotating member includes:
a lengthwise connector guide coupled and fixed to the third frame;
a lengthwise elastic member configured to contact the lengthwise rotary shaft; and a lengthwise connector inserted into the lengthwise connector guide to press the lengthwise elastic member so that the lengthwise elastic member is elastically contracted.

6. The battery transporting apparatus according to claim 5,
wherein the lengthwise connector has a perforated hole formed therein,
wherein a pressing bar is provided vertically at an inner side of the lengthwise connector, and
wherein the lengthwise elastic member is inserted into the perforated hole and pressed by the pressing bar.

7. The battery transporting apparatus according to claim 6,
wherein the lengthwise connector guide includes:
a lengthwise first guide having an inner surface of a regular hexagonal shape; and
a lengthwise second guide having an inner surface of a circular shape, wherein the lengthwise connector includes:
a lengthwise first outer surface portion having an outer surface of a regular hexagonal shape to correspond to the lengthwise first guide; and
a lengthwise second outer surface portion having an outer surface of a circular shape to correspond to the lengthwise second guide.

\* \* \* \* \*